No. 816,033. PATENTED MAR. 27, 1906.
J. H. PARKER.
ROSETTE FOR ELECTRIC LIGHT WIRES.
APPLICATION FILED FEB. 20, 1905.
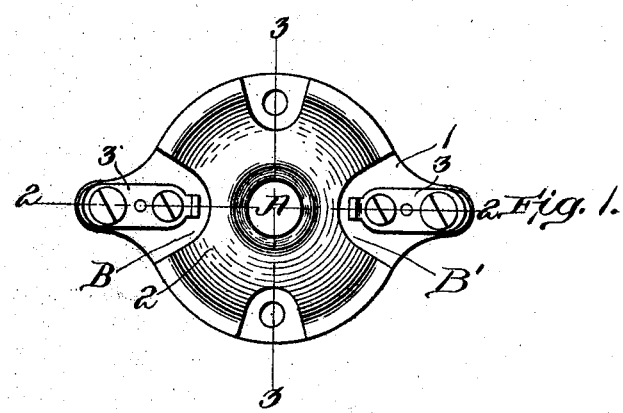
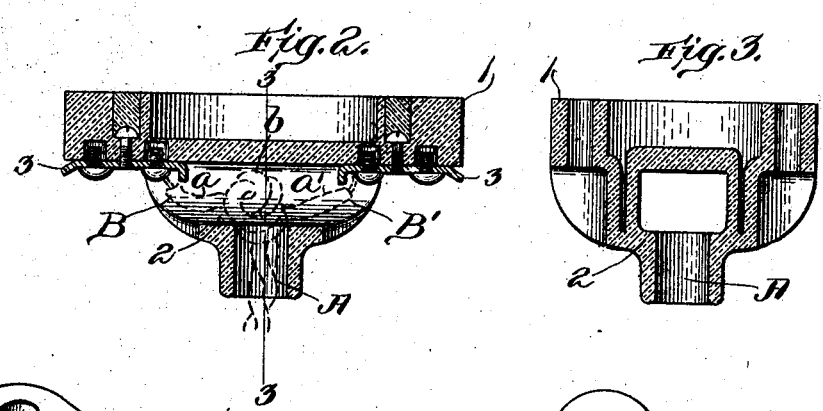
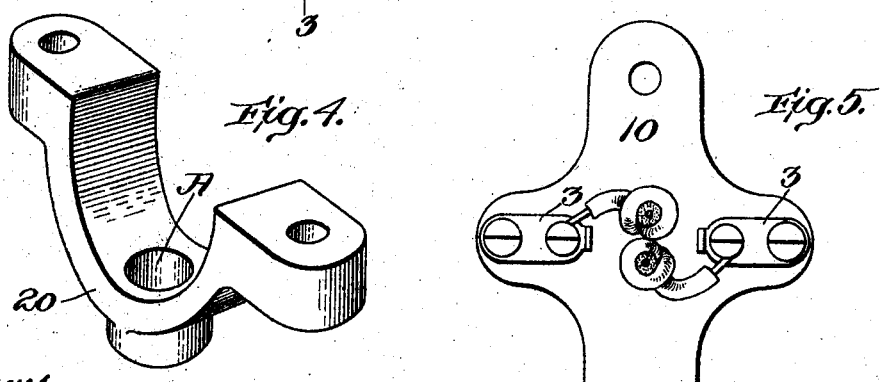
Witnesses:
C. B. Maynadier.
H. C. Bowser.
Inventor:
John Henry Parker,
by Maynadier & Rockwell,
Attorneys.

UNITED STATES PATENT OFFICE.

JOHN HENRY PARKER, OF SAUGUS, MASSACHUSETTS.

ROSETTE FOR ELECTRIC-LIGHT WIRES.

No. 816,033.  Specification of Letters Patent.  Patented March 27, 1906.

Application filed February 20, 1905. Serial No. 246,527.

*To all whom it may concern:*

Be it known that I, JOHN HENRY PARKER, of Saugus, in the county of Essex and State of Massachusetts, have invented an Improved Rosette for Electric-Light Wires, of which the following is a specification, reference being had to the accompanying drawings, making a part hereof, in which—

Figure 1 is a plan of my improved rosette in the best form now known to me. Fig. 2 is a section on line 2 2 of Fig. 1. Fig. 3 is a section on line 3 3 of Fig. 1. Figs. 4 and 5 show a modification.

My invention is a rosette whose body part is preferably made of porcelain and consists of two main portions—namely, the base 1 and the arch 2—formed near its middle with the cord-hole A, the essence of the matter being that the archway is practically unobstructed, as best shown in Fig. 2, to make three entrances or exits B and B' for the branches of the lamp-cords $a$ $a'$ and the central cord-hole A, near the middle of the arch 2, for the two lamp-cords $a$ $a'$ beyond the knot $b$, the hole A being so much smaller than the entrances or exits B B' as to allow the lamp-cords $a$ $a'$ to be readily secured to the contacts 3, which may be, as usual, the knots $b$ to be tied, and the lamp-cords to extend through the hole A in such wise that strain on the lamp-cords is all taken off of the branches $a$ $a'$ and thrown on the knot or knots $b$ $b$, for it will be clear that the lamp-cords may extend singly or twisted together through the hole A, then through a knot $b$, one in each branch $a$ $a'$, as shown in dotted lines in Fig. 5, and also clear that the knots formed in the branches $a$ $a'$ may be so connected as to form a single knot, too large to pass through the hole A, as shown in dotted lines in Fig. 2.

My improved rosette is not only of extreme simplicity, but possesses the great advantage of reducing the labor of applying the lamp-cords to the minimum, while it also makes certain that the strain which comes on the lamp-cords as they extend from the exterior surface about the hole A is borne wholly by the knot or knots within the archway B B' and wholly removed from the branches $a$ $a'$ and the bared ends of those branches which connect with the contacts 3.

In Figs. 4 and 5 I show a modified form of my invention in which the rosette is in two parts, 10 and 20, the archway between them permitting the manipulation of the cords.

What I claim as my invention is—

A rosette for electric-light wires comprising a base; an arch with a cord-hole near its middle, the arch extending across the base and forming with the base a continuous archway for the reception and manipulation of the lamp-cords, the archway being of substantially uniform size throughout and having end openings which are larger than the cord-hole and through which the branches extend to their contacts; all arranged to admit of the knotting of the branches of the lamp-cord and of the arrangement in the archway of both lamp-cords with reference to the cord-hole and the arrangement of the branches each with reference to its contact, substantially as described.

JOHN HENRY PARKER.

Witnesses:
C. B. MAYNADIER,
G. A. ROCKWELL.